(12) United States Patent
Wada

(10) Patent No.: US 8,150,389 B2
(45) Date of Patent: Apr. 3, 2012

(54) PORTABLE COMMUNICATION TERMINAL DEVICE AND RESPONSE MESSAGE TRANSMITTING METHOD

(75) Inventor: Hitoshi Wada, Yokohama (JP)

(73) Assignee: Kyocera Corporation, Kyoto (JP)

( * ) Notice: Subject to any disclaimer, the term of this patent is extended or adjusted under 35 U.S.C. 154(b) by 506 days.

(21) Appl. No.: 11/283,158

(22) Filed: Nov. 18, 2005

(65) Prior Publication Data

US 2006/0116133 A1 Jun. 1, 2006

(30) Foreign Application Priority Data

Nov. 26, 2004 (JP) .................................. 2004-342667

(51) Int. Cl.
*H04W 24/00* (2009.01)
(52) U.S. Cl. ...................... 455/425; 455/67.11; 455/423; 455/115.2; 455/424; 455/420
(58) Field of Classification Search ................ 455/412.2, 455/425, 67.11, 423, 115.2, 424, 420; 340/426.21, 340/7.1, 7.53; 370/242, 452, 79
See application file for complete search history.

(56) References Cited

U.S. PATENT DOCUMENTS

| 5,758,280 | A * | 5/1998 | Kimura | 455/412.2 |
|---|---|---|---|---|
| 6,216,016 | B1 * | 4/2001 | Cronin | 455/567 |
| 6,823,182 | B1 * | 11/2004 | Higuchi et al. | 455/412.1 |
| 7,272,382 | B2 * | 9/2007 | Servi et al. | 455/411 |
| 7,302,280 | B2 * | 11/2007 | Hinckley et al. | 455/567 |
| 2001/0031633 | A1 | 10/2001 | Tuomela et al. | |
| 2002/0052225 | A1 * | 5/2002 | Davis et al. | 455/567 |
| 2002/0091473 | A1 * | 7/2002 | Gardner et al. | 701/35 |
| 2002/0128000 | A1 * | 9/2002 | do Nascimento, Jr. | 455/414 |
| 2003/0050075 | A1 * | 3/2003 | Rangarajan et al. | 455/456 |
| 2003/0176205 | A1 * | 9/2003 | Oota et al. | 455/567 |
| 2004/0176083 | A1 * | 9/2004 | Shiao et al. | 455/417 |
| 2004/0198305 | A1 * | 10/2004 | Slutter et al. | 455/345 |

(Continued)

FOREIGN PATENT DOCUMENTS

CN 1461164 A 12/2003

(Continued)

OTHER PUBLICATIONS

Japanese language office action and its English language translation for corresponding Japanese application 2004342667 lists the references above.

(Continued)

*Primary Examiner* — Kwasi Karikari
(74) *Attorney, Agent, or Firm* — DLA Piper LLP (US)

(57) ABSTRACT

A portable communication terminal device includes a section for detecting a call from a calling party; a section for obtaining position data for a present position of the portable communication terminal device; a section for storing data of a plurality of areas and a plurality of messages to the calling party, which respectively correspond to the areas; and a section for performing a determination when the call is detected. In the determination, it is determined whether the present position based on the position data belongs to one of the plurality of the areas stored in advance. The terminal also includes a section for performing message transmission when it is determined that the present position belongs to one of the plurality of the areas. In the message transmission, one of the plurality of the messages is transmitted, which corresponds to the one of the plurality of the areas.

13 Claims, 4 Drawing Sheets

U.S. PATENT DOCUMENTS

| | | | |
|---|---|---|---|
| 2004/0266399 A1* | 12/2004 | Simpson | 455/412.1 |
| 2005/0101304 A1* | 5/2005 | Lin et al. | 455/413 |
| 2005/0122959 A1* | 6/2005 | Ostrover et al. | 370/352 |
| 2005/0201533 A1* | 9/2005 | Emam et al. | 379/88.19 |
| 2007/0298756 A1* | 12/2007 | Hiltunen | 455/403 |

FOREIGN PATENT DOCUMENTS

| | | |
|---|---|---|
| JP | 2001-189966 | 7/2001 |
| JP | 2001326718 A | 11/2001 |
| JP | 2002213967 A | 7/2002 |
| JP | 2004274644 A | 9/2004 |

OTHER PUBLICATIONS

Chinese language office action and its partial English translation for corresponding Chinese application 2005101286609 lists the references above.

Japanese language office action dated Oct. 4, 2011 and its partial English translation for corresponding Japanese application 2004342667 lists references previously submitted.

* cited by examiner

PORTABLE COMMUNICATION TERMINAL DEVICE AND RESPONSE MESSAGE TRANSMITTING METHOD

BACKGROUND OF THE INVENTION

1. Field of the Invention

The present invention relates to a portable communication terminal device and a response message transmitting method.

Priority is claimed on Japanese Patent Application No. 2004-342667, filed Nov. 26, 2004, the content of which is incorporated herein by reference.

2. Description of the Related Art

In conventional portable communication terminal devices, a response message used in an absence mode (in which a user of the portable communication terminal device cannot answer the call) can be switched only manually (i.e., switching between a fixed message, a driving mode message for responding during driving a car, and an original response message). That is, once a response message is set, the set message is transmitted to a calling party (who calls the portable communication terminal device) regardless of a situation or a place in which the user is present. For example, when the response message is set to a driving mode message, the driving mode message may be transmitted to the calling party even if the user is not driving a car.

In view of the above, in a known technique, the position of the portable communication terminal device is specified, and the response message is automatically changed in accordance with the specified position. For example, a technique has been proposed for a personal handy-phone system, in which movement of a portable communication terminal device is predicted based on the position information obtained by using IDs (identifications) of wireless base stations, and one of various announcing messages is automatically transmitted as a response in accordance with predicted results (see, for example, Japanese Patent Publication (Kokai) No. 2001-189966-A).

However, in the above conventional technique in which movement of a portable communication terminal device is predicted using IDs of wireless base stations, it is difficult for the user to designate a specified place such as a hospital or a company.

SUMMARY OF THE INVENTION

In light of the above circumstances, an object of the present invention is to provide a portable communication terminal device and a response message transmitting method, by which a user can transmit a calling party a response message suitable for a specified place designated by the user, thereby improving convenience for the user.

Therefore, the present invention provides a portable communication terminal device comprising:

a call detecting section for detecting a call from a calling party;

a present position obtaining section for obtaining position data for a present position of the portable communication terminal device;

a message storage section for storing data of a plurality of areas and a plurality of messages which respectively correspond to the plurality of areas;

a determination section for performing a determination when the call is detected by the call detecting section, wherein the determination section determines whether the present position based on the position data obtained by the present position obtaining section belongs to one of the plurality of the areas stored in the message storage section; and a transmission control section for performing message transmission when it is determined by the determination section that the present position belongs to one of the plurality of the areas stored in advance, wherein the transmission control section transmits at least one message from among the plurality of the messages, which corresponds to said one of the plurality of the areas, to the calling party.

BRIEF DESCRIPTION OF THE DRAWINGS

The nature of this invention, as well as other objects and advantages thereof, will be explained in the following with reference to the accompanying drawings, in which identical reference numerals or symbols designate the same or similar parts throughout the figures.

DETAILED DESCRIPTION OF THE INVENTION

Hereinafter, an embodiment according to the present invention will be described with reference to the appended figures.

Figure 1:
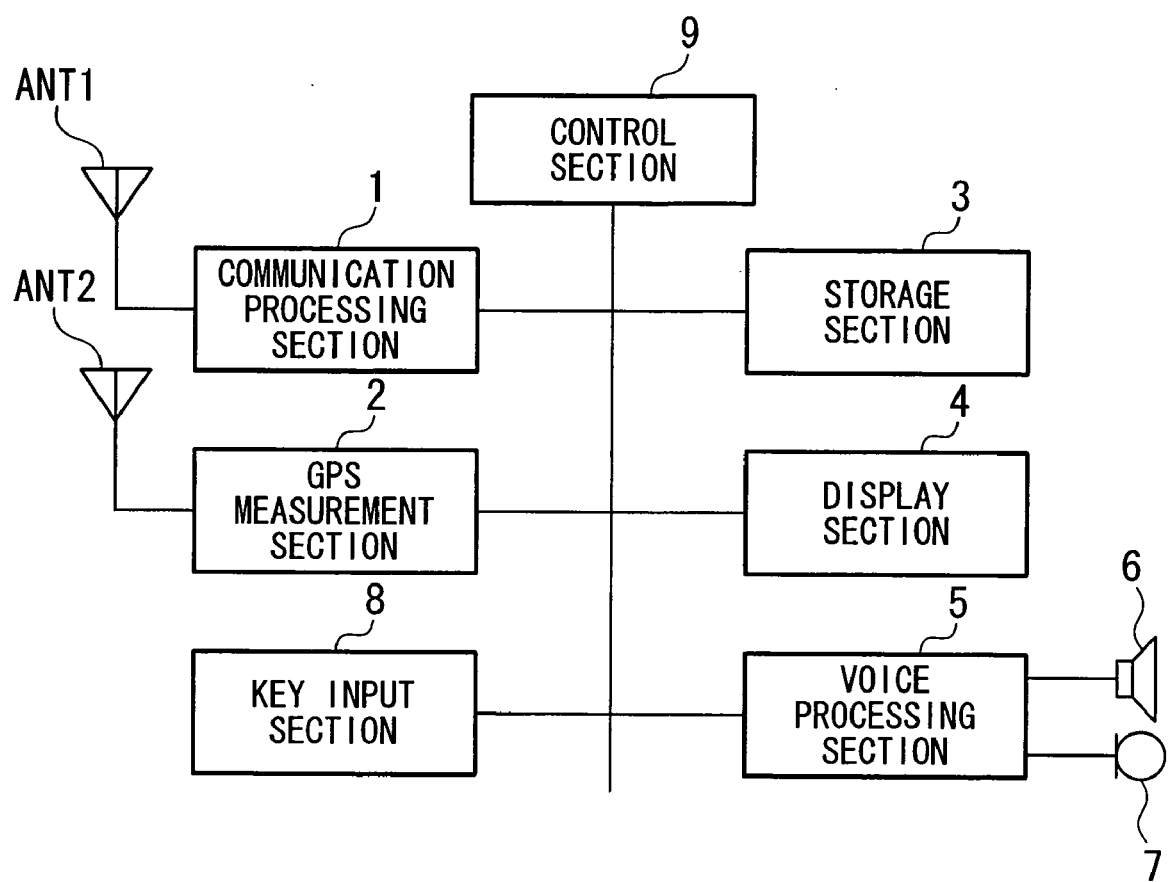
FIG. 1 is a block diagram showing the structure of a portable communication terminal device as an embodiment of the present invention.

FIG. 1 is a block diagram showing the structure of a portable communication terminal device as an embodiment of the present invention. In FIG. 1, a communication processing section 1 performs wireless voice or data communication via an antenna ANT1.

In particular, in the present embodiment, when a call is detected in an absence mode, a response message or an answering message in accordance with the location of the portable communication terminal device (when the call is detected or received) is transmitted to a calling party. A GPS (global positioning system) measurement section 2 determines the present position by simultaneously acquiring distances from four or more GPS satellites among 24 GPS satellites which orbit at a height of approximately 20,000 km. The distance from each GPS satellite is computed by receiving a radio wave from the GPS satellite via an antenna ANT2 and measuring a time period necessary for arrival at a receiver of the portable communication terminal device. A storage section 3 stores (i) area data which indicate a plurality of areas such as a company, a school, a hospital, or the like, which are designated by a user in advance, (ii) a plurality of response messages corresponding to the plurality of areas, (iii) an ordinary answering (or response) message which does not relate to the plurality of areas, or the like. In addition, each area data is specified based on map data.

A display section 4 may be a liquid crystal display. A voice processing section 5 generates analog data for a voice signal of the calling party who is in conversation so as to output the voice based on the analog data from a speaker 6, or converts a user voice in conversation, input through a microphone 7, to digital data. The response message or the answering message is obtained by voice recording or text-to-voice conversion. A key input section 8 consists of ten keys and various function keys which are used for inputting a designation by the user, a phone number for calling, or the like. A control section 9 controls the above-described sections, in particular, it performs registration of areas and response messages, transmission of a response message in an absence mode, or the like.

Below, operations of the present embodiment will be explained.

Registration of Response Message

Figure 2:
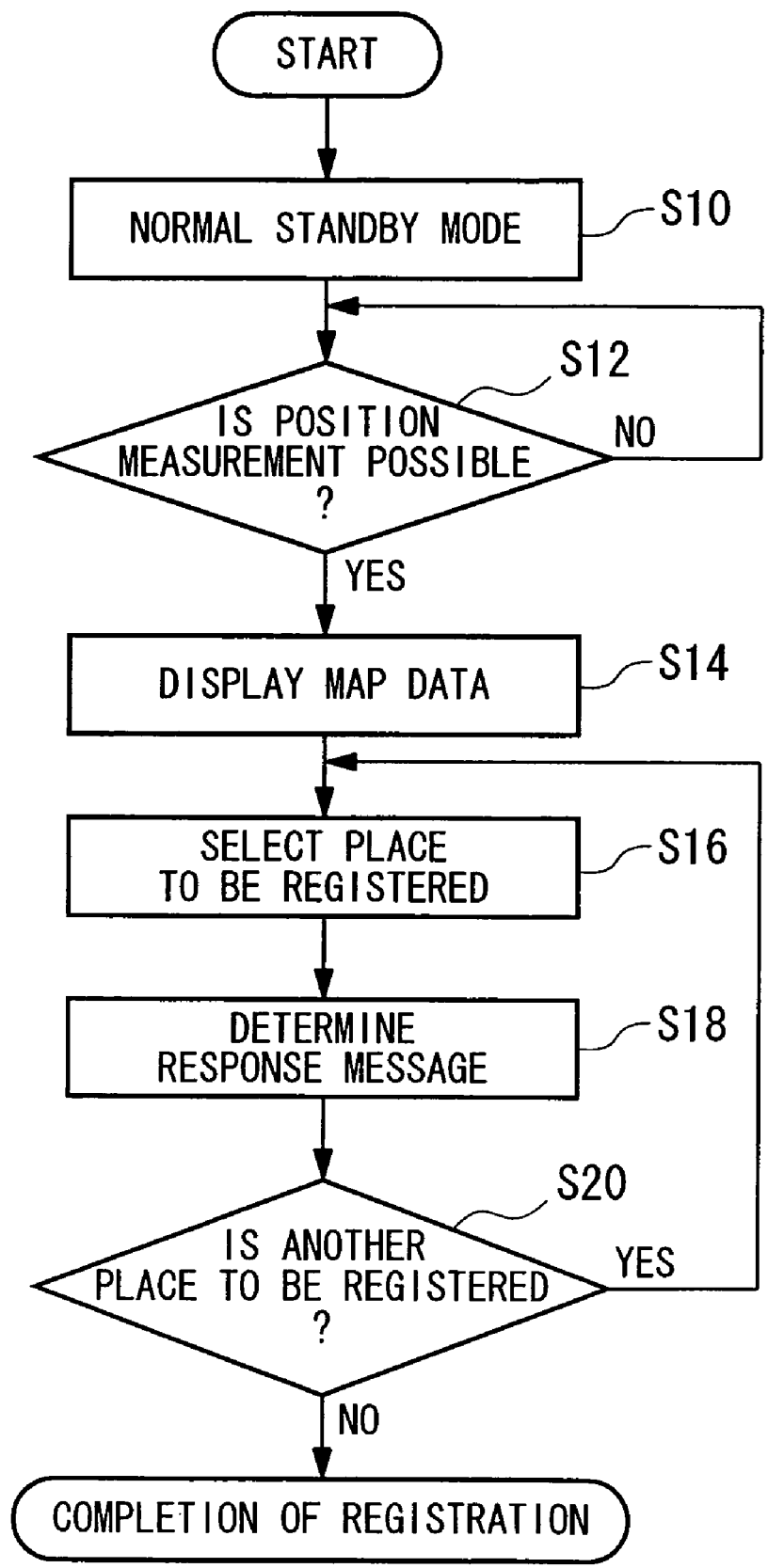
FIG. 2 is a flowchart explaining a process of registering one or more response messages for the portable communication terminal of the embodiment.

First, registration of response messages will be explained. FIG. 2 is a flowchart explaining a process of registering one or more response messages for the portable communication terminal device of the present embodiment.

When the power of the portable communication terminal device is switched on, the portable communication terminal device enters a normal standby state (see step S10). Next, it is determined whether position measurement is possible (see step S12). If it is possible, the present location is measured by the GPS measurement section 2, and map data (i.e., a map) around the present location (as the center position of the map) are displayed in the display section 4 (see step S14). Map data may be stored in advance in the storage section 3, or may be downloaded from a server via a network. Instead of map data around the present location, map data may be displayed by inputting an address, a name of the nearest station, a latitude, a longitude, or the like.

In the next step S16, a place (or an area) where the user will probably stay or drop in, such as a company, a school, a hospital, or the like, is selected on the displayed map. In the next step S18, a response message to be transmitted in the selected area is determined. This response message can be selected from among a fixed response message stored in the storage section 3 in advance, an original message which was input and recorded using the microphone 7 and stored in the storage section 3, and a text sentence (subjected to voice synthesis when the sentence is output) which was input and registered using the key input section 8 and stored in the storage section 3. The area and the response message corresponding to the area are stored in the storage section 3 while generating a corresponding relationship therebetween.

In the next step S20, it is determined whether another place (or area) is going to be registered. If another place is going to be registered, the operation returns to step S16, and the above-described registration processing is again performed. Conversely, if no other place is to be further registered, registration processing is completed, and the operation of the present flow is completed. In the above operation, instead of displaying a map, an address, a name of a station, a latitude, a longitude, or the like may be directly input.

If a company is registered as an area, a response message such as "I am now at work (or in session) and will call you back later" may be registered. If a school is registered as an area, a response message such as "I am now in a school and will call you back later" may be registered. If a hospital is registered as an area, a response message such as "I am now in a hospital and will call you back as soon as possible after the consultation" may be registered.

Operation When Receiving a Call

Figure 3:
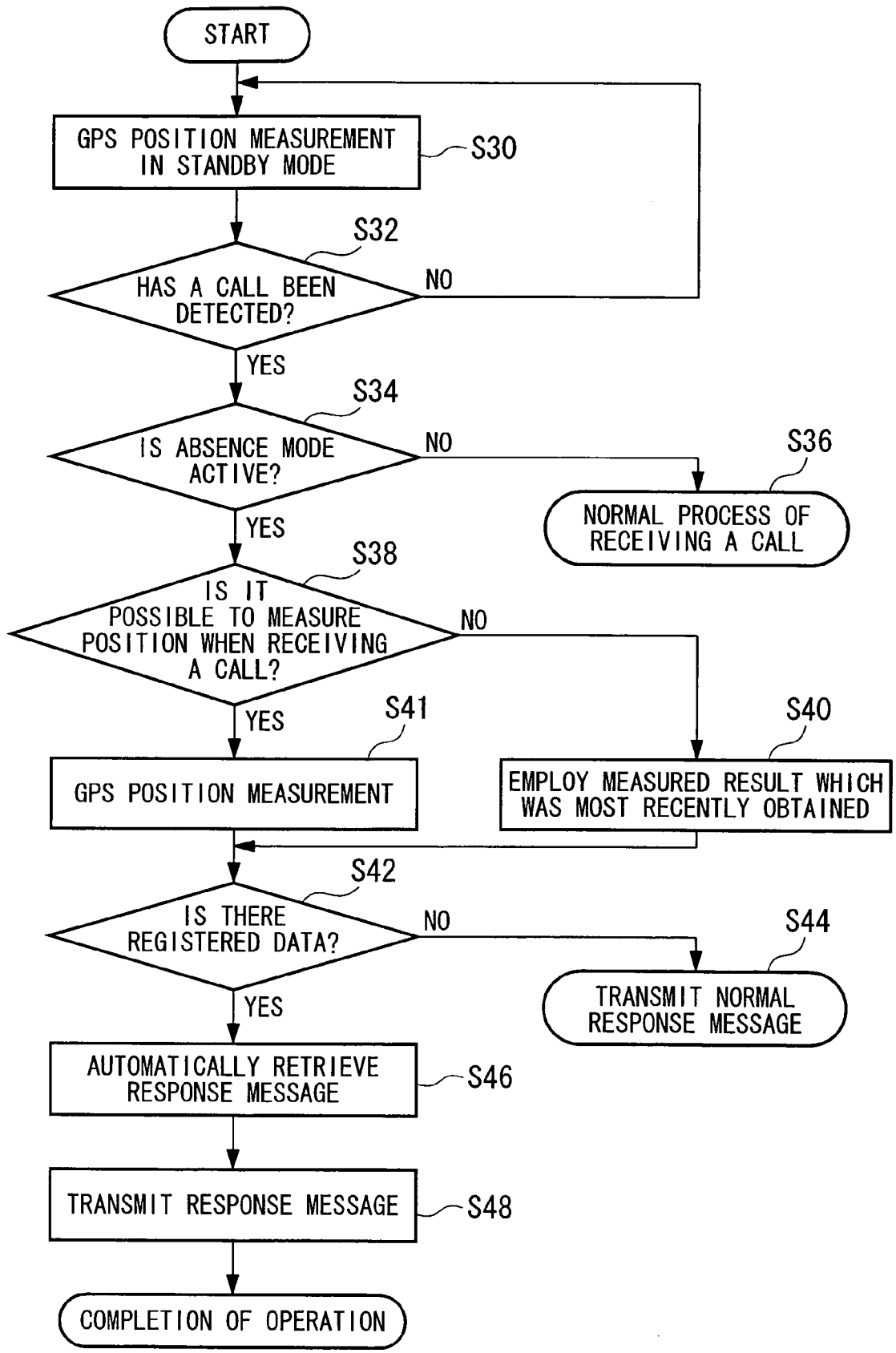
FIG. 3 is a flowchart explaining the operation performed when receiving a call in the portable communication terminal device of the embodiment.

Below, the operation performed when receiving or detecting a call will be explained. FIG. 3 is a flowchart explaining the operation performed when receiving a call in the portable communication terminal device of the present embodiment. When the portable communication terminal device is in a standby mode, the present location is measured using the GPS measurement section 2 (see step S30). The measurement using GPS will be explained in detail later.

In the next step S32, it is determined whether a call has been detected. If no call has been detected, the above measurement is repeated at regular intervals, so as to update the present location. If a call has been detected, it is determined whether an absence mode is active (or has been selected) (see step S34). If the absence mode is not active now, a normal process of receiving a call is performed (see step S36).

If the absence mode is presently active, it is determined whether location measurement when receiving a call is possible (see step S38). If the measurement is impossible because the user is in a building or the like, a measured result which was most recently obtained is defined as the present position (see step S40). Conversely, when the measurement is possible, the present location (i.e., the present position) is measured by the GPS measurement section 2 (see step S41). In the next step S42, it is determined whether the present position has been registered as an area data in the storage section 3. In the determination of step S42, it is determined that the present position has been registered when a difference between the position data measured when receiving a call and the position data registered as the relevant area data is within a predetermined range (e.g., 100 m).

When no area data corresponding to the present position (measured when receiving a call) has been registered, a normal answering (or response) message stored in the storage section 3 is transmitted to the calling party (see step S44). Conversely, when the present position measured when receiving a call has been registered as area data, a response message corresponding to the area data is automatically retrieved (see step S46) and is transmitted to the calling party (see step S48).

If the user is in a company, a response message such as "I am now at work (or in session) and will call you back later" may be automatically transmitted. If the user is in a school, a response message such as "I am now in a school and will call you back later" may be automatically transmitted. If the user is in a hospital, a response message such as "I am now in a hospital and will call you back as soon as possible after the consultation" may be automatically transmitted.

GPS Position Measurement

Figure 4:
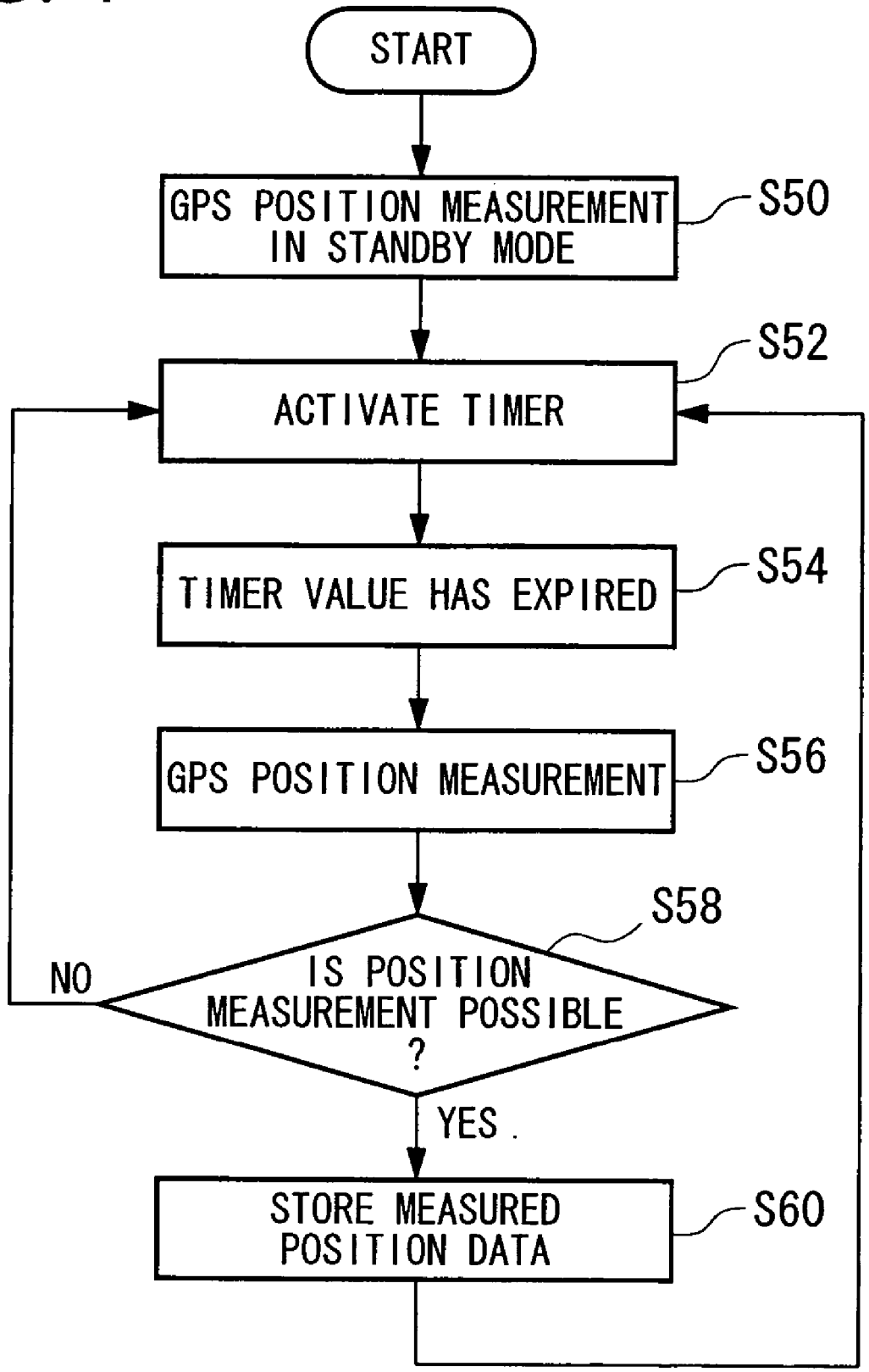
FIG. 4 is a flowchart explaining the GPS position measurement performed in a standby mode of the portable communication terminal device of the embodiment.

Next, GPS position measurement performed in a standby mode, described in the above step S30, will be explained. FIG. 4 is a flowchart explaining the GPS position measurement.

In the first step S50, position measurement is performed by the GPS measurement section 2 while the portable communication terminal device is in the standby mode. In the next step S52, a timer is activated. When the value of the timer has expired (see step S54), position measurement is again performed by the GPS measurement section 2 (see step S56), so as to determine whether the position measurement is possible (see step S58). If the measurement is impossible because the user is in a building or the like, the operation returns to step S52, and the timer is again activated. When the value of the timer has again expired, position measurement is again performed. That is, position measurement is repeated at regular intervals. When the measurement becomes possible, measured data (i.e., position data) is stored in the storage section 3 (see step S60).

According to the above-described embodiment which uses position data (measured by a GPS or the like) of the portable communication terminal device, the present location can be specified based on the position data measured when receiving a call from a calling party (or position data which was most recently measured, when position measurement is impossible when receiving a call), and a response message suitable for the location can be automatically transmitted to the calling party, where the response message was stored in advance in a corresponding relationship to position data (i.e., an area). In particular, under a situation in which usage of a cellular phone is legally restricted while driving a car or the like, conventionally, the mode of the phone is manually switched to a drive mode. However, according to the present invention, the mode can be automatically switched to the drive mode while traveling at a high speed (i.e., when position measurement is possible and temporal displacement in position data is large) or the like, thereby improving convenience and safety for the user.

In the above-described embodiment, the control section 9 is implemented in a computer system or the like. In addition, a series of processes performed by the control section 9 is stored as a program in a computer-readable storage medium. The series of processes is performed by loading and executing the program by a computer. That is, each processing section in the control section 9 is implemented when a central processing unit such as a CPU loads the program on a main memory such as a ROM or a RAM and executes data processing and computation.

The computer-readable storage medium may be a magnetic disk, a magneto-optical disk, a CD-ROM, a DVD-ROM, or a semiconductor memory. The computer program may be transmitted via a communication line to a computer, and the computer that receives the program may execute the program.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A portable communication terminal device comprising:
a call detecting section for detecting a call from a calling party;
a transmission section for transmitting a response message to the calling party;
a position obtaining section for obtaining position data with respect to a present position of the portable communication terminal device;
a storage section for storing data of a plurality of positions, which are location positions, and a plurality of messages which respectively correspond to the plurality of the positions; and
a retrieval section for:
performing a determination when the call is detected by the call detecting section, wherein the retrieval section determines one of the plurality of the positions stored in the storage section, which corresponds to the present position based on the position data obtained by the position obtaining section, and
retrieving one of the plurality of the messages stored in the storage section, which corresponds to the determined position, wherein
the transmission section transmits the retrieved message as the response message to the calling party.

2. The portable communication terminal device according to claim 1, wherein each message is obtained by a voice recording or text-to-voice conversion.

3. The portable communication terminal device according to claim 1, wherein:
the storage section stores a normal message which does not relate to any position; and
when no message corresponding to the present position based on the position data obtained by the position obtaining section is retrieved by the retrieval section from among the messages stored in the storage section, the transmission section transmits the normal message as the response message to the calling party.

4. The portable communication terminal device according to claim 1, wherein:
the position obtaining section obtains the position data after the call detecting section detects the call; and
the retrieval section retrieves the message corresponding to the present position based on the position data which is obtained after the call is detected.

5. The portable communication terminal device according to claim 4, wherein if the position data cannot be obtained by the position obtaining section after the call detecting section detects the call, the retrieval section retrieves the message corresponding to the present position based on the position data which is obtained by the position obtaining section before the call detecting section detects the call.

6. The portable communication terminal device according to claim 1, further comprising:
a message determining section for determining each message corresponding to each position.

7. The portable communication terminal device according to claim 1, further comprising:
an absence mode setting section for setting an absence mode, wherein the transmission section transmits the response message to the calling party when the absence mode is set by the absence mode setting section.

8. The portable communication terminal device according to claim 1, wherein:
the storage section stores data of a plurality of areas as the plurality of the positions, and stores the plurality of the messages which respectively correspond to the plurality of the areas; and
the retrieval section determines one of the plurality of the areas, which includes the present position based on the position data obtained by the position obtaining section, and the retrieval section retrieves the message corresponding to the determined area.

9. The portable communication terminal device according to claim 8, wherein the retrieval section specifies the area, which includes the present position, based on map data.

10. A message transmitting method for transmitting a response message to a calling party when detecting a call from the calling party, the method comprising the steps of:
storing data of a plurality of positions, which are location positions, and a plurality of messages which respectively correspond to the plurality of the positions in advance;
determining one of the plurality of the stored positions, which corresponds to the present position based on the obtained position data, when a call from the calling party is detected;
retrieving one of the plurality of the stored messages, which corresponds to the determined position; and
transmitting the retrieved message as the response message to the calling party.

11. The message transmitting method according to claim 10, further comprising the step of storing a normal message which does not relate to the plurality of the positions in advance, wherein when no position corresponding to the present position based on the obtained position data is determined from among the plurality of the positions, the normal message is transmitted as the response message to the calling party.

12. The message transmitting method according to claim 10, wherein:

the position data is obtained after the call is detected; and the message, which corresponds to the present position based on the position data obtained after the call is detected, is retrieved from among the plurality of the messages.

13. The message transmitting method according to claim 12, wherein if the position data cannot be obtained after the call is detected, the message, which corresponds to the present position based on the position data obtained before the call is detected, is retrieved from among the plurality of the messages.

* * * * *